US007046299B1

(12) United States Patent
Lowe

(10) Patent No.: US 7,046,299 B1
(45) Date of Patent: May 16, 2006

(54) DIGITAL VIDEO SYNCHRONIZER WITH BOTH DECODED DIGITAL AND UNDECODED ANALOG OUTPUTS

(75) Inventor: Virgil L. Lowe, Roswell, GA (US)

(73) Assignee: Fortel, DTV, Duluth, GA (US)

( * ) Notice: Subject to any disclaimer, the term of this patent is extended or adjusted under 35 U.S.C. 154(b) by 862 days.

(21) Appl. No.: 09/969,415

(22) Filed: Oct. 1, 2001

Related U.S. Application Data

(60) Provisional application No. 60/236,764, filed on Sep. 29, 2000.

(51) Int. Cl.
*H04N 11/00* (2006.01)

(52) U.S. Cl. ...................................... 348/500; 348/500

(58) Field of Classification Search ................ 348/500, 348/512, 518, 665, 429, 519
See application file for complete search history.

(56) References Cited

U.S. PATENT DOCUMENTS

| 3,542,945 | A |   | 11/1970 | Parker ........................ 178/5.4 |
| 3,860,952 | A |   | 1/1975  | Tallent et al. .................. 358/8 |
| 4,240,105 | A |   | 12/1980 | Faroudja ....................... 358/31 |
| 4,297,728 | A |   | 10/1981 | Lowe .......................... 360/36 |
| 4,349,832 | A | * | 9/1982  | Gallo ......................... 348/600 |
| 5,068,752 | A | * | 11/1991 | Tanaka et al. ................. 360/32 |
| 5,204,787 | A |   | 4/1993  | Suzuki et al. ............... 360/36.1 |
| 5,282,038 | A |   | 1/1994  | Lowe ......................... 358/183 |
| 5,303,061 | A |   | 4/1994  | Matsumoto et al. ........ 358/320 |
| 5,359,366 | A |   | 10/1994 | Ubukata et al. ............ 348/536 |
| 5,398,079 | A |   | 3/1995  | Liu et al. ..................... 348/699 |
| 5,424,784 | A |   | 6/1995  | Raby .......................... 348/668 |
| 5,424,849 | A |   | 6/1995  | Yamashita et al. .......... 358/337 |
| 5,430,487 | A | * | 7/1995  | Naimpally ............. 375/240.25 |
| 5,452,006 | A |   | 9/1995  | Auld .......................... 348/390 |
| 5,461,487 | A |   | 10/1995 | Asakura ....................... 358/339 |
| 5,526,060 | A |   | 6/1996  | Raby .......................... 348/663 |
| 5,528,307 | A |   | 6/1996  | Owada et al. ............... 348/497 |
| 5,614,952 | A |   | 3/1997  | Boyce et al. ................ 348/392 |
| 5,663,771 | A |   | 9/1997  | Raby .......................... 348/663 |
| 5,686,965 | A |   | 11/1997 | Auld .......................... 348/423 |
| 5,694,174 | A | * | 12/1997 | Suzuki ....................... 348/518 |
| 5,727,091 | A |   | 3/1998  | Kinouchi et al. ........... 382/246 |
| 5,742,784 | A |   | 4/1998  | Potter ......................... 395/389 |
| 5,758,010 | A |   | 5/1998  | Ando .......................... 386/87 |
| 5,784,120 | A |   | 7/1998  | Cummins et al. ........... 348/537 |
| 5,805,238 | A |   | 9/1998  | Raby et al. ................. 348/609 |

FOREIGN PATENT DOCUMENTS

JP          02000134584 A        5/2000

* cited by examiner

*Primary Examiner*—Paulos M. Natnael
(74) *Attorney, Agent, or Firm*—Womble Carlyle Sandridge and Rice, PLLC

(57) ABSTRACT

A digital video synchronizer for providing parallel and coordinated synchronization paths for decoded and undecoded video. Processing is added for a parallel path in a synchronization memory that bypasses the comb filter and video decoder circuitry to allow a digitized composite video to pass through unchanged. This parallel path is coordinated with the decoder path to provide features of both a composite video synchronizer and a digital component decoder/synchronizer with time base corrector. A digital encoder transforms component video back into modulated composite video. The digital encoder generates a synchronizing and color burst signal to replace the sync and burst signals of the composite video signal. The synchronized composite and synchronized encoded signals are adjusted in timing, gain and DC offset to match one another so that the signals can be faded, mixed, or multiplexed without detectable differences. A multiplexer switches between the encoded version of the video signal and the undecoded version.

11 Claims, 1 Drawing Sheet

DIGITAL VIDEO SYNCHRONIZER WITH BOTH DECODED DIGITAL AND UNDECODED ANALOG OUTPUTS

CROSS-REFERENCE TO RELATED APPLICATIONS

This application claims the benefit of U.S. Provisional Application No. 60/236,764 filed Sep. 29, 2000. This application is related to co-pending and commonly assigned patent applications "Composite Video Decoder", Ser. No. 09/523,889, "Time Base Corrector", Ser. No. 09/523,884, both filed Mar. 13, 2000, and "Digital Comb Filter", Ser. No. 09/637,140, filed Aug. 11, 2000. Each co-pending patent application is hereby incorporated by reference into this description as fully as if here represented in full.

BACKGROUND

The present invention relates generally to an apparatus for synchronization of digital video and, more particularly, to a digital video synchronizer providing parallel and coordinated synchronization paths for decoded and undecoded video.

For the processing of video signals to proceed without visible flaws, all signals must be precisely synchronized. The most important feature of this synchronization process is that it must be transparent, that is to say that is must change the signal as little as possible. For many years, this task has been accomplished by digital video synchronizers that digitized an analog composite video signal, wrote the digitized composite video signal into a memory using a clock that was locked to the input video signal, read the digitized composite video signal out of the memory using a clock that was locked to the station reference synchronizing generator, and converted the digitized composite video signal back to analog to provide an analog signal that was synchronized in time to the video studio or broadcast station.

With the advent of digital video and its increasingly common use in television studios, current video synchronizers are constricted primarily as decoders to create a digital video signal from the composite analog signal, and only secondarily as synchronizers to bring the signal into time synchronization with the other signals in the TV studio. These video synchronizer devices digitize the input composite video signal and separate it into its luminance and chrominance components. The chroma is then demodulated to R-Y and B-Y components to provide a digital video signal. This digital video signal is then synchronized to bring it into time synchronization with the studio signals. When such devices provide an analog output, they do so by using an encoder to convert the digital component signal back to an analog composite signal to feed the analog equipment in the studio.

Unfortunately, this process is not nearly as transparent as the previous process. The video decoder/synchronizers that generate an analog output using an encoder and a digital-to-analog converter (DAC) after the synchronizer create errors in the composite video output. The errors are caused by the problems inherent in the operation of a comb filter and the decoding and encoding process. These errors cause visible defects in the output signal, particularly after several generations of processing.

Today's video studios and broadcast stations are in a transition period where most studios are equipped with both composite analog equipment and digital equipment. The true need in this situation is to have a synchronizer that can operate both ways—without decoding the signal so there is maximum transparency and with decoding so that there can be a digital output.

SUMMARY OF THE INVENTION

The purpose of this invention is to meet the need identified above without the cost associated with two independent synchronizers. There are also other benefits that come from combining the two operating modes including high quality freeze for still frames and hot switch, and the ability to switch between the fully transparent and the re-encoded outputs depending on the source of the video being synchronized.

This invention uses the circuitry of the "Composite Video Decoder" patent application Ser. No. 09/523,889, filed Mar. 13, 2000; the "Time Base Corrector" patent application Ser. No. 09/523,884, filed Mar. 13, 2000; U.S. Pat. No. 6,278,495B1, for "Digital Comb Filer for Decoding Composite Video Signals", which issued on Aug. 21, 2001; and "Digital Comb Filter" patent application Ser. No. 09/637,140, filed Aug. 11, 2000, which is a continuation-in-part of patent application Ser. No. 09/523,888, which issued as U.S. Pat. No. 6,278,495B1. The issue fee for the "Composite Video Decoder" patent application has been paid. Each of these commonly assigned, co-pending patent applications and issued patents are hereby incorporated by reference into this description as fully as if here represented in full.

In the present invention, processing is added for a parallel path in the synchronization memory that bypasses the comb filter and video decoder, and allows the digitized composite video to pass through unchanged. This path is coordinated with the decoder path to provide the most desirable features of both a composite video synchronizer and a digital component decoder/synchronizer and time base corrector (TBC). A digital encoder is also incorporated for some output modes and to generate a synchronizing and color burst signal to replace the sync and burst signals of the composite signal. The synchronized composite and synchronized encoded signals are adjusted in timing, gain and direct current (DC) offset to match one another so they can be faded, mixed or multiplexed without detectable differences.

The invention is a unique digital video synchronizer that provides a clean path composite video synchronizer and component digital synchronizer with a decoder and following encoder for both analog composite and digital component video inputs and outputs. It provides the best features and specifications of composite and component processing for television broadcasters and studios during the transition from analog to digital television.

An important difference between this video synchronizer and prior art systems is that the video synchronizer described herein provides a clean composite video output that has not been decoded and re-encoded while simultaneously providing a decoder to produce a serial digital component output and an encoder to produce a composite signal from a serial digital input. Several new circuits were invented as well as unique ways of sharing circuits to reduce the overall circuitry and cost of the device. Several functions common to composite synchronizers and some digital component synchronizers such as chroma gain, hue control, freezing video, hot switch, vertical interval data and test signal processing and sync and burst regeneration or pass are also processed in a unique way.

This invention accepts two forms of input signals and generates two forms of output signals. One set of input and output signals corresponds to the Society of Motion Pictures Television Engineers (SMPTE) 259 specification for serial digital component signals. SMPTE 259M is a standard which describes the serial digital interface for system M (525/60) digital television equipment, operating at either 4:2:2 component video signal or 4:xFsc NTSC composite video signal. The standard proposed by the SMPTE is intended for 10 bit digitization schemes. The other set of input and output signals is for analog composite input and analog composite output signals. The digital component signal is processed for Y gain, R-Y gain B-Y gain, hue, and black level. Other processing functions such as black stretch, and further luma and chroma combing can optionally be added.

BRIEF DESCRIPTION OF THE DRAWING

The invention is better understood by reading the detailed description of an exemplary embodiment in conjunction with the accompanying drawing, wherein.

DETAILED DESCRIPTION OF THE INVENTION

Figure 1:
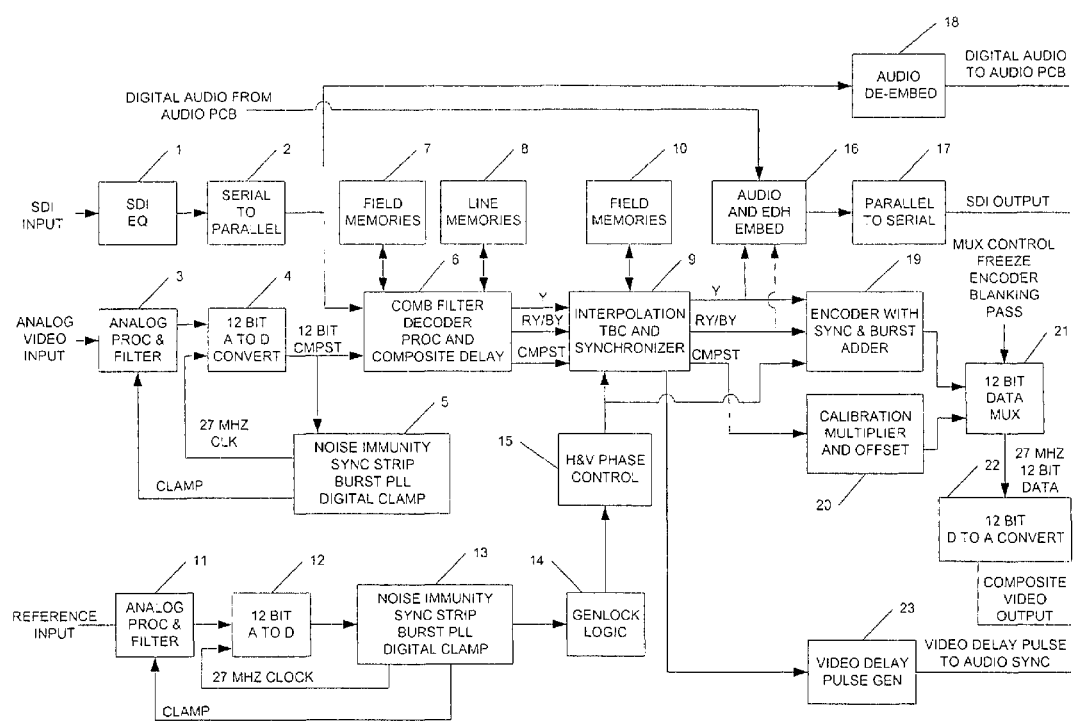
FIG. 1 is the system block diagram of the digital video synchronizer showing the interconnection of the video decoder, synchronizer and time base corrector subsystems in accordance with an exemplary embodiment of the invention

The unique aspect of this invention is the provision of parallel and coordinated synchronization paths for decoded and undecoded video. While simple, this provision is unique as is evidenced by the wide variety of competing products presently on the market that have no such provision or capability. The present invention coordinates the two synchronization paths and provides parallel control of the common synchronizer functions:

1. Video Gain Control;
2. Chroma Gain Control;
3. Black Level Control;
4. Hue Control;
5. Image Position Control;
6. SCH Phase Control;
7. Genlock Coarse Phase Control;
8. Genlock Fine Phase Control;
9. Field and Frame Freeze;
10. Hot Switch;
11. Time Base Correction.

FIG. 1 illustrates a general block diagram of an exemplary embodiment of the invention. Block 1 represents a serial digital input receiver and equalizer. The SDI input normally conforms to the SMPTE 259 standard. Block 2 represents a serial to parallel converter that produces a parallel digital component signal conforming to the CCIR-601 standard. CCIR (now ITU-R) 601 is a recommendation adopted around the world for uncompressed digital video used in studio television production. Block 3 represents an analog composite input circuit that includes a differential analog input receiver with a DC clamp circuit for removing hum and DC offsets to correct the input to the proper DC level and gain to drive the analog to digital converter (ADC). A low pass filter is also included to eliminate aliasing input frequencies. Block 4 represents an analog to digital converter that samples the analog video at 27 MHz so the output can be digitally filtered and processed before being decimated to the standard 13.5 MHz luma clocking frequency of the CCIR-601 standard. Block 5 represents the digital sync stripper, digital clamp circuit, the digital portion of the analog clamp circuit and the digital PLL (phase locked loop) circuit.

Block 6 represents an advanced comb filter circuit that uses both three line adaptive comb filtering, adaptive field combing and adaptive frame combing in varying combinations according to the pixel-by-pixel video content of the analog input. Its operation is fully described in U.S. Pat. No. 6,278,495B1, incorporated by reference herein. The output of block 6 is a decoded component Y, R-Y and B-Y signal. A unique composite video circuit is also incorporated to make the invention possible. Block 7 represents a set of field memories and block 8 represents a set of line delay memories. These memories may be incorporated in an field-programmable gate array (FPGA) or application specific integrated circuit (ASIC) with the decoder or they may be any form of static random access memory (SRAM), synchronous dynamic RAM (SDRAM), first-in-first out (FIFO) memory or other type of high-speed memories. These memories enable the comparison and combing of the present line of video with the preceding and following lines of video and with the corresponding line on the preceding field and frame.

Block 9 represents the synchronizer and its time base corrector (TBC) function. The operation of the TBC is fully described in pending application Ser. No. 09/523,884, incorporated by reference herein. Block 10 represents the array of field memories necessary for synchronization. Eight fields of memory are necessary if phase alternating line (PAL) signals are to be synchronized with full transparency since the PAL color field sequence only repeats every eight fields.

Blocks 11, 12, and 13 are similar to blocks 3, 4 and 5 except that they operate on the station reference genlock signal. Block 14 represents the genlock logic that tracks the location of the genlock horizontal and vertical synchronization periods and controls the reading of the video out of the synchronization memory and the phase of the subcarrier for the encoder represented in block 19. Block 15 provides the control necessary to shift the phase, both horizontally and vertically, of the output relative to the genlock signal.

Block 16 represents the point in the system at which digital audio from an outside audio subsystem can be embedded into the digital video stream. Block 17 represents the parallel to serial converter that takes the CCIR-601 parallel video and streams it out in the SMPTE-259 format. Block 18 represents the point at which any audio embedded in the incoming serial digital video can be stripped out and sent to an outside audio subsystem.

Block 19 represents the encoder that transforms the component video back into modulated composite video. This encoder can function on component video regardless of whether it was obtained from an analog or digital source. This block is also used to generate the sync and burst signals that are reinserted into the undecoded analog signal when it is being used. Block 20 is used to rescale the undecoded analog signal to calibrate the system and compensate for variations in analog circuitry.

Block 21 represents a multiplexer that switches between the (re-)encoded version of the video signal and the undecoded version. When sync and burst signals are being reinserted into undecoded video, this multiplexer switches at the end of video and at the start of video on each line. Whenever this switch is operated, the switch point should be targeted at points in the signal at which both signals should have the same value. Since as a practical matter they cannot be relied upon to be exactly the same value, this switch must fade between them over the course of several clock cycles.

Block 22 represents the digital to analog converter with its associated reconstruction filters and cable drive amplifiers.

Block 23 represents the circuitry that generates a pulse proportional to the delay of the video synchronizer. The normal use of this pulse is to signal a companion audio synchronizer so that the relative timing between audio and video can be maintained.

To provide the parallel video paths in actual operation of the inventive digital video synchronizer, the following steps must be taken. First, the unprocessed video from the A/D converter 4 must be preserved and then delayed so that it is in time synchronization with the current line of processed video after the band separation filters and comb filter processing of block 6. At this step, some of the controls can be accomplished. Video gain control can be accomplished by a subtractor, a multiplier and an adder. The subtractor offsets the values so that gain is applied relative to the black level instead of being relative to an arbitrary zero point. The multiplier applies the gain, and the adder restores the video back to offset form. A difference between the number subtracted and the number added will also accomplish black level control. Providing these controls at this point in the signal flow will also provide some of the necessary delay. Another portion of the delay can be obtained from the comb filter subsystem 6. Immediately after the digitized video data is received into the decoder, it is separated into high band and low band components for use in the comb filter. These band-split components are individually delayed through line 8 and field memories 7 to provide the various reference lines for the comb. In systems that use both the line above and the line below the current line for combing, there is a net delay through the comb filter of a little more than a line. Taking the two band split components and adding them back together after the first line of delay will perfectly recover the original composite signal delayed by the length of the band split filter plus the line of delay for the comb. This delay plus the composite processing amplifier (proc amp) processing delay leaves only a small delay that must be added to the composite path to bring it in time synchronization with the combed and demodulated video. This delay is easily provided using a small FIFO memory such as is readily available in an FPGA or ASIC. Naturally, the delay could also be created with a single, independent, larger FIFO.

Next the data must be passed through a field memory system 10. For simplicity in controlling video phase and position, it is desirable that both video paths flow through the same memory system. The required paths through the memory are a 10-bit path for luma, a 10-bit path for chroma and a 12-bit path for composite video. The luma and chroma word sizes are dictated by CCIR-601, and the 12-bit path for composite video is dictated by the need to keep the same level of accuracy on the composite path that is available on the decoded path. The sum of these word sizes is 32 bits which is an even multiple of 8. This happens to fit well into readily available memory parts because they are commonly organized in eight bit bytes, so the needed storage fits evenly into common memory chips with no wasted bits.

Finally, the two paths must be coordinated at the entrance to the digital to analog converter (DAC) 22 based on the operating mode of the device. The operating modes are:
1. analog input, full pass through;
2. analog input, sync and burst reinserted;
3. analog input, chroma gain control required;
4. analog input, time base correction required;
5. analog input, minimum delay; and
6. digital input.

The coordination strategy for each operating mode is as follows:
1. Full Pass-Through—In this mode, the multiplexer 21 remains switched to the composite side full time.
2. Sync and Burst Reinserted—In this mode, the multiplexer 21 sends the composite side to the digital-to-analog converter (DAC) 22 during active video time and sends the encoded video to the DAC 22 during the horizontal and vertical interval time.
3. Chroma Gain Control—This mode operates in conjunction with either of the previous modes. In prior undecoded synchronizers, chroma gain control was accomplished by treating all high pass data as being chroma. Since a fully separated chroma is available in a combined device such as provided by this invention, it is a superior source of data for use in chroma gain control. Since the multiplexer 21 is not a simple switch, but instead is a cross-fader, chroma gain control can be combined with the multiplexer 21 by providing a variable coefficient set to the cross-fader in the chroma path.
4. Time Base Correction—In this mode, the multiplexer 21 remains switched to the encoder side 19 full time because the digital output from the system must also be time base corrected, and it is more efficient to have a single time base corrector 9. In addition, since there is rarely a need for multi-generation time base correction in a modern video studio, the minor signal distortion caused by decoding and re-encoding does not have a chance to accumulate. As an alternate, a separate analog time base corrector could be provided for the composite path, but the quality of results would be similar, at best, to the decode, time-base-correct, reencode method.
5. Minimum Delay—For minimum delay, it is not desirable to use the entire color field sequence for synchronization. In this case, the multiplexer 21 remains switched to the encoded side 19 full time and there is at most a two-field delay inherent in the synchronization.
6. Digital Input—In this mode, there is no valid composite input available, so the multiplexer 21 remains switched to the encoded side 19 full time.
7. Of the other controls for the composite signal path mentioned above, the following controls are described below:
   a. Hue Control
   b. Image Position Control
   c. SCH Phase Control
   d. Genlock Fine Phase Control
   e. Field and Frame Freeze
   f. Hot Switch Hue control, image position control and SCH phase control interact with each other. Image position is controlled by adjusting the relative timing of the video data coming from the memory to the sync generated by the encoder 19. However, since the video is not orthogonally sampled relative to the subcarrier, any such moves will change the hue of the video. This could be compensated by changing the phase of the generated burst to match, but that would change the SCH relationship, which should normally remain constant. Fortunately, changing the phase of the input data sample clock relative to the incoming color burst will change the hue and this is the preferred method of controlling the hue whether for production reasons or to compensate for video position moves. Note that none of these control function is are available without the Sync and Burst Reinsertion mode of operation.

Genlock fine phase control is achieved by adjusting the phase of the DAC clock relative to the color burst on the genlock signal. Genlocking is a system of synchronizing two video signals to the same timing and color phase in order to coordinate their colors and syncs. Genlocking permits mixing, cross-fading, keying, and special effects generation between the two video signals. This allows the analog output of the system to be precisely phase aligned with other analog equipment in a studio without having any noticeable effect on the digital output.

Field and frame freeze are accomplished by write protecting a field or frame of memory and playing it back continuously through the encoder 19 to the DAC 22. This represents a significant improvement to the method previously used on undecoded synchronizers in which the high band data was interpreted as chroma and its sign inverted in alternate fields to simulate the construction of the appropriate color field.

Hot switch is a technique familiar to one of ordinary skill in the art of conventional video synchronizers. A hot switch is an abrupt change of the video input from one source to another source that may be different in horizontal, vertical or subcarrier phase. The typical compensation to such a disruption is to freeze the last good field until the write clock servo and memory write sequence control can lock to the new input signal and write one or more fields into the unfrozen portion of the memory without error. In this invention, hot switch is considerably more complex than provided by either previous decoders or previous undecoded synchronizers. Since up to four fields for National Television Standards Committee (NTSC) color telecasting and eight fields of memory for PAL color telecasting are required to appropriately synchronize undecoded composite video, and even more fields of video can be present and used for video delay functions, great care must be taken in the sequencing of field playback during such disruptions. In addition, the operation must be sequenced into re-encoded mode and back into undecoded mode as part of the transition from one signal to another.

In an exemplary embodiment, the first step of a hot switch is to detect a disruption in the timing of the incoming video signal. Once such a disruption is detected, that field must be marked as bad and inappropriate for display, the playback of video must be frozen on the last known good field, and the undecoded mode of operation must be disabled. The last known good field then must be protected from being overwritten and all other fields must be marked as containing old data. When a new input signal is established and stable, writing to all fields except the last known good field can be re-enabled. At the end of each field as it is rewritten, it must be marked as new. When the synchronizer timing calls for a field which has been marked as new, the freeze of the last known good field is released and that field is re-enabled for writing. Playback of each field in its sequence can then proceed unless an old field is encountered. In that case, the previous field is repeated until a field marked new has been encountered. Once eight new fields have been played back, the undecoded mode can be re-enabled.

An alternate embodiment of the hot switch is to move the write side of the memory addressing to another section of the larger memory that is used in this invention. In this method, the out-of-sequence playback problem is largely eliminated because it is the protection of the last good field while writing new data that raises the greatest potential for getting fields out of sequence.

Thus the combination of new circuits and sharing of some circuits for composite and component synchronization gives this synchronizer a unique ability to provide a very clean analog composite video output while giving a very high performance digital component output unequaled by the present state of the art.

Those skilled in the art will appreciate that many modifications to the exemplary embodiments of the present invention are possible while still obtaining the beneficial results of the present invention. It will also be apparent that some of the desired benefits of the present invention can be obtained by selecting some of the features of the present invention without using other features. Thus, the foregoing description is provided as illustrative of the principles of the present invention and not limitation thereof, since the scope of the present invention is defined by the claims.

Additionally, corresponding structures, materials, acts, and equivalents of any means plus function elements in the claims below are intended to include any structure, material, or acts for performing the functions in combination with any other claimed elements as specifically claimed.

While the invention has been particularly shown and described with reference to a preferred embodiment, it will be understood by those skilled in the art that various changes in form and detail may be made without departing from the spirit and scope of the present invention.

What is claimed is:

1. A digital video synchronizer apparatus for providing decoded digital output and undecoded analog output, comprising:
    an input receiver and equalizer for receiving a serial digital input signal;
    a serial to parallel converter for generating a parallel digital component signal from the serial digital input signal;
    an analog input circuit for receiving an analog video input signal;
    an analog to digital converter for converting the analog video input signal to a composite digital signal;
    a multi-dimensional comb filter for separating the composite digital signal into luma and chroma information;
    a video synchronizer circuit for providing both an undecoded composite video output and a component digital video output;
    an encoder circuit for transforming the component digital video into a modulated composite video;
    a multiplexer circuit for switching between the modulated composite video signal and the undecoded composite video output signal; and
    a digital to analog converter for generating a composite video output.

2. The digital video synchronizer apparatus of claim 1 further comprising:
    a plurality of field memories for storing field and frame delay comb filter taps; and
    a plurality of line delays for generating a plurality of line taps for the vertical portion of the comb filter.

3. The digital video synchronizer apparatus of claim 1 wherein the video synchronizer circuit comprises a time base corrector for removing time base errors from the combed luma and chroma information.

4. The digital video synchronizer apparatus of claim 1 further comprising:
    an analog amplifier circuit for receiving a reference input signal;
    a burst phase locked loop circuit for locking a reference clock to a color burst of the reference input signal; and
    a genlock logic circuit that tracks the location of a genlock horizontal synchronization period and a vertical synchronization period and controls the reading of the video out of a synchronization memory and a phase of the subcarrier for the encoder.

5. The digital video synchronizer apparatus of claim 4 further comprising a horizontal and vertical phase control circuit that provides the control necessary to shift the phase of the video output signal relative to the genlock signal.

6. The digital video synchronizer apparatus of claim 1 further comprising a field memory system for providing a 10-bit path for a luma signal, a 10-bit path for a chroma signal, and a 12-bit path for a composite video signal through the video synchronizer circuit.

7. The digital video synchronizer apparatus of claim 1 wherein the encoder circuit generates synchronization and burst signals that are reinserted into the undecoded analog signal.

8. The digital video synchronizer apparatus of claim 1 further comprising a calibration circuit that rescales the undecoded analog signal and compensates variations in analog circuitry.

9. The digital video synchronizer apparatus of claim 1 further comprising a video delay pulse generation circuit that generates a pulse proportional to a delay of the video synchronizer circuit to signal a companion audio synchronizer in order to maintain a relative timing between audio and video signals.

10. The digital video synchronizer of apparatus of claim 1 further comprising a circuit for embedding digital audio from an audio subsystem into a digital video stream.

11. The digital video synchronizer apparatus of claim 1 further comprising a circuit for removing any audio that is embedded in an incoming serial digital video signal and sending it to an outside audio subsystem.

* * * * *